VOLTAGE-CONTROLLED ATTENUATOR

Filed Oct. 16, 1962 2 Sheets-Sheet 1

INVENTOR
JACOB BRONSTEIN
BY Wade Koontz
ATTORNEY
and
Richard J Killoren
AGENT

Nov. 2, 1965 J. BRONSTEIN 3,215,927

VOLTAGE-CONTROLLED ATTENUATOR

Filed Oct. 16, 1962 2 Sheets-Sheet 2

INVENTOR
JACOB BRONSTEIN
BY Wade Koontz
ATTORNEY
Richard J Killoren and
AGENT

United States Patent Office 3,215,927

Patented Nov. 2, 1965

3,215,927

VOLTAGE-CONTROLLED ATTENUATOR

Jacob Bronstein, Baltimore, Md., assignor, by mesne assignments, to the United States of America as represented by the Secretary of the Air Force Filed Oct. 16, 1962, Ser. No. 231,047
4 Claims. (Cl. 323—93)

This invention relates to a device for providing variable attenuation of small R.F. voltages in the video-frequency and intermediate-frequency ranges.

One subject of the invention is to provide variable attenuation of R.F. voltages by means of variable D.C. voltages with negligible power consumption.

A further object is to provide variable attenuation of R.F. voltages wherein no motors, switches or other mechanical parts are required.

These and other objects will be more fully understood from the following detailed description taken with the drawing, wherein.

As a general rule, in any receiver or video amplifier chain it is necessary, or at least desirable, to have some form of gain control. This control may be manual, automatic, or (in the majority of cases) it may be a combination of the two. When remote control is not desired, it is common practice to use either D.C. control of control grid or screen grid voltage, or step attenuation for manual control. When stability or accuracy is an important consideration, the latter method offers a number of advantages despite its higher cost, size, and difficulty in achieving sufficiently small increments of attenuation. Moreover, if both a wide range attenuation and fine control are needed, two or more attenuators in cascade are usually required to achieve the desired result. For example, it would take considerable mechanical complexity to obtain 60 db of attenuation in 0.5 db steps, all in a single knob control.

In the case of AGC systems, generally speaking, the only practicable scheme of achieving the desired variation in gain in the past has been the control of the transconductance of one or more vacuum tube amplifiers by variation of control grid bias. Such a method can, in most cases, be made to operate quite successfully. However, in certain types of radar and communications systems an important design criterion is linearity over a wide dynamic range of input signal levels, in some cases, as much as 100 db being required. When this is the case, the usual methods of controlling gain become difficult to apply.

According to this invention, a simple variable attenuator is provided in the form of a capacitive voltage divider which makes use of voltage sensitive capacitors.

Figure 1:
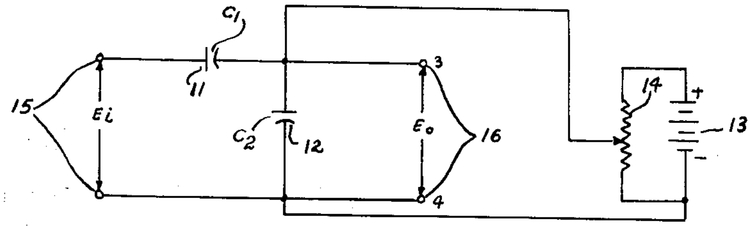
FIG. 1 is a circuit schematic for the basic capacitive voltage divider attenuator of the invention.

With reference to FIG. 1 of the drawing which shows the basic capacitive voltage divider circuit of the invention, a capacitor 11 has a voltage sensitive capacitor 12 in series therewith. The capacitor 12 may be any type of voltage sensitive capacitor, for example, "Ferroelectric" dielectric capacitors capable of capacitance variations of the order of 3 or 4 to 1. The control voltage for the variable capacitor is provided by a power supply 13 and potentiometer 14. The input signal is applied to terminals 15 with the output taken off at 16.

With the device of FIG. 1 it is possible to obtain an attenuation range A.

$$A=\frac{1+Kr_0}{1+r_0}$$

where $$r_0=\frac{C_{2\ \mathrm{min.}}}{C_1}$$

and $$K=\frac{C_{2\ \mathrm{max.}}}{C_{2\ \mathrm{min.}}}$$

Where $C_{2\ \mathrm{max.}}$ is the maximum capacitance of voltage sensitive capacitor 12 and $C_{2\ \mathrm{min.}}$ is the minimum capacitance of capacitor 12 at the maximum and minimum setting respectively of potentiometer 14.

Figure 2:
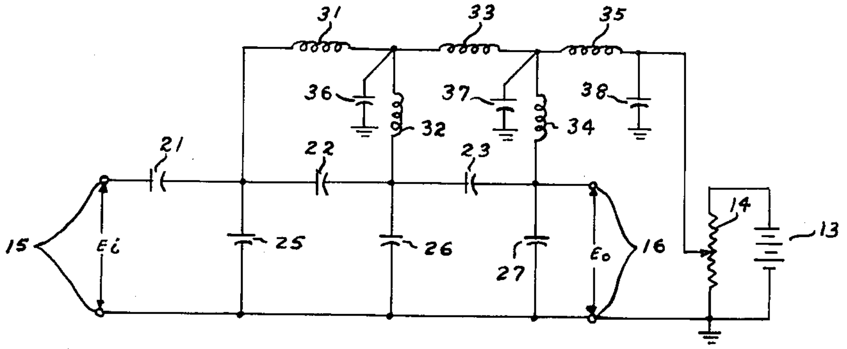
FIG. 2 is a circuit schematic for a three-stage voltage controlled capacitive attenuator of the invention; and, FIG. 3 is a circuit schematic for a temperature compensated voltage controlled capacitive attenuator of the invention.
Figure 2:
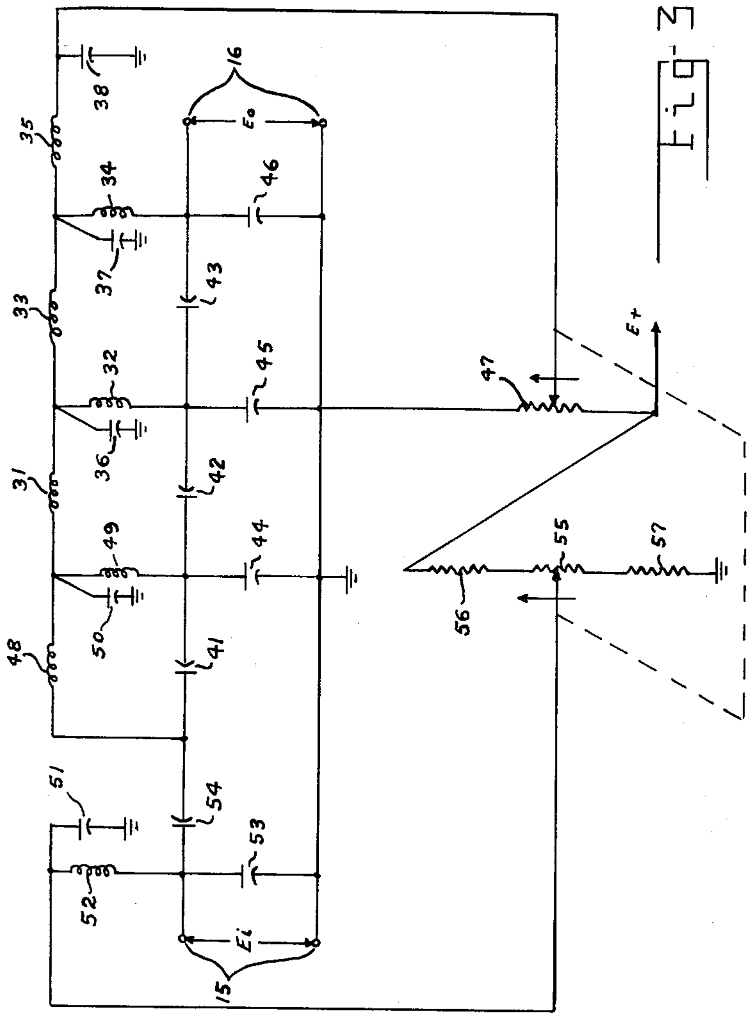

A circuit for providing a greater attenuation range is shown in FIG. 2. In this figure a plural stage attenuator is provided in which capacitors 21, 22 and 23 are fixed and capacitors 25, 26 and 27 are voltage sensitive capacitors. A decoupling filter circuit comprising inductors 31, 32, 33, 34 and 35, together with capacitors 36, 37 and 38, is provided between the various stages of the attenuator and the power supply 13. A potentiometer 14 is provided as in the device of FIG. 1. In this device the input is provided at 15 and the output is taken off at 16 as in FIG. 1.

Since ferrodielectrics are sensitive to changes in temperature, as well as applied voltage, it is necessary to compensate for temperature when the operation of the device takes place under conditions where temperature varies over a wide range.

The device of FIG. 3 shows such a temperature-compensated device. In this device all of the condensers 41, 42, 43, 44, 45 and 46 are voltage sensitive. In this device the attenuation is controlled from a voltage divider 47 connected between the E+ supply and ground as in the devices of FIGS. 1 and 2. The control voltage, however, has no effect on capacitors 41, 42 and 43 but only controls the capacitance of capacitors 44, 45 and 46 as in FIG. 2. A change in ambient temperature however will affect all of the capacitors so that the ratio of series to shunt capacitance, due to a change in temperature, is constant and therefore provides a constant attenuation regardless of the temperature change. The interstage decoupling circuits are provided as in FIG. 2.

To provide a constant input capacitance to the circuit, a capacitor 53 controlled by a potentiometer 55 is located in the input circuit to the attenuator. The capacitance of 53 is made to decrease as the capacitance of the attenuator is increased to provide a constant impedance to the signal source. This will simplify the design of the signal source. In some cases, resistors 56 and 57 may have to be made variable to obtain proper tracking between the capacitor 53 and the capacitors of the attenuator. In this figure additional decoupling filter circuits comprising elements 48, 49, 50, 51 and 52 are provided to decouple the compensating input stages 53 and 54 from the power supply and the other stages of the attenuator.

There is thus provided a device for providing attenuation of small R.F. voltages with negligible power consumption and without the use of any motors or switches.

While certain specific embodiments have been described.

it is obvious that numerous changes may be made without departing from the general principle and scope of the invention.

I claim:

1. An attenuation circuit, comprising: a plurality of attenuation stages, each of said attenuation stages having a first capacitive element, and a second capacitive element connected in series, said second capacitive element of each of said stages being a voltage sensitive capacitor, each succeeding stage of said attenuation circuit being connected across the voltage sensitive capacitor of the preceding stage, means for applying an R.F. signal to the first stage of said attenuation circuit, a direct current power supply, means for connecting said power supply across the voltage sensitive capacitor of each of said stages, means connected between said power supply and said voltage sensitive capacitors for varying the voltage applied across said voltage sensitive capacitor, R.F. signal decoupling means, connected between each of said stages and said power supply, and an output circuit connected across the voltage sensitive capacitor of the last stage of said attenuation circuit.

2. An attenuation circuit, comprising: a plurality of attenuation stages, each of said attenuation stages having a first voltage-sensitive capacitive element and second voltage-sensitive capacitive element connected in series, each succeeding stage of said attenuation circuit being connected across the second capacitive element of the preceding stage with the first capacitive element of all of the stages being connected in series, means for applying an R.F. signal to the first stage of said attenuation circuit, a direct current power supply, means for connecting said power supply across the second voltage sensitive capacitive element of each of said stages, means connected between said power supply and said second voltage-sensitive capacitive elements of each of said stages for varying the voltage applied across the second voltage sensitive capacitive element, R.F. signal decoupling means, connected between each of said stages and said power supply, and an output circuit connected across the second voltage-sensitive capacitive element of the last stage of said attenuation circuit.

3. An attenuation circuit, comprising: a plurality of attenuation stages, each of said attenuation stages having a first voltage-sensitive capacitive element and a second voltage-sensitive capacitive element connected in series, each succeeding stage of said attenuation circuit being connected across the second capacitive element of the preceding stage with the first capacitive element of all of the stages being connected in series, means for applying an R.F. signal to the first stage of said attenuation circuit, a direct current power supply, means for connecting said power supply across the second voltage-sensitive capacitive element of each of said stages, means connected between said power supply and said second voltage-sensitive capacitive element of each of said stages for varying the voltage applied across the second voltage sensitive capacitor, R.F. signal decoupling means, connected between each of said stages and said power supply, means connected in the input circuit of the first attenuation stage for providing a substantially constant input impedance to the attenuation circuit and an output circuit connected across the second voltage-sensitive capacitive element of the last stage of said attenuation circuit.

4. An attenuation circuit, comprising: a plurality of attenuation stages, each of said attenuation stages having a first voltage-sensitive capacitive element and a second voltage-sensitive capacitive element connected in series, each succeeding stage of said attenuation circuit being connected across the second capacitive element of the preceding stage with the first capacitive element of all of the stages being connected in series, means for applying an R.F. signal to the first stage of said attenuation circuit, a direct current power supply, means for connecting said power supply across the second voltage-sensitive capacitive element of each of said stages, means connected between said power supply and said second voltage-sensitive capacitive element of each of said stages for varying the voltage applied across the second voltage-sensitive capacitor, R.F. signal decoupling means, connected between each of said stages and said power supply, additional voltage-sensitive capacitive means connected in the input circuit of said first attenuation stage, means for connecting said power supply across said additional capacitive means, means for varying the voltage applied to said additional capacitive means inversely to the voltage applied to the second voltage-sensitive capacitive element of each of said stages to thereby provide substantially constant input impedance to the attenuation circuit.

References Cited by the Examiner

UNITED STATES PATENTS

| | | | |
|---|---|---|---|
| 2,677,799 | 5/54 | Foster | 317—258 |
| 2,960,613 | 11/60 | Spitzer | 317—258 |
| 3,079,571 | 2/63 | Elliott | 307—88.5 |

OTHER REFERENCES

Electrical Manufacturing, page 83, December 1954, "Circuit Applications of Voltage Sensitive Capacitors."

LLOYD McCOLLUM, *Primary Examiner.*